Figure 7:
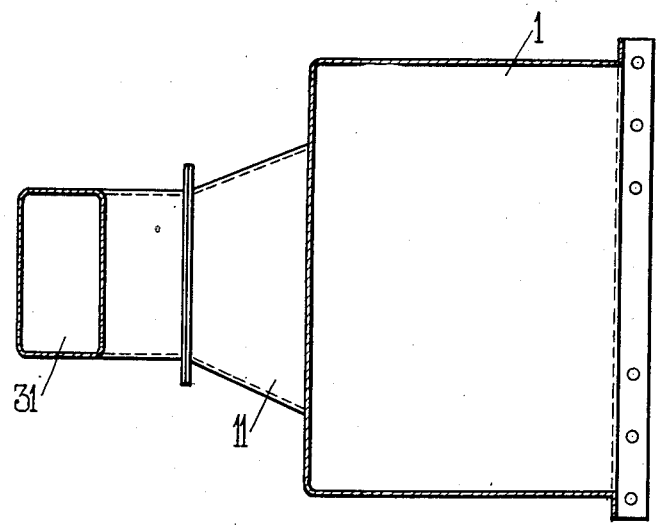

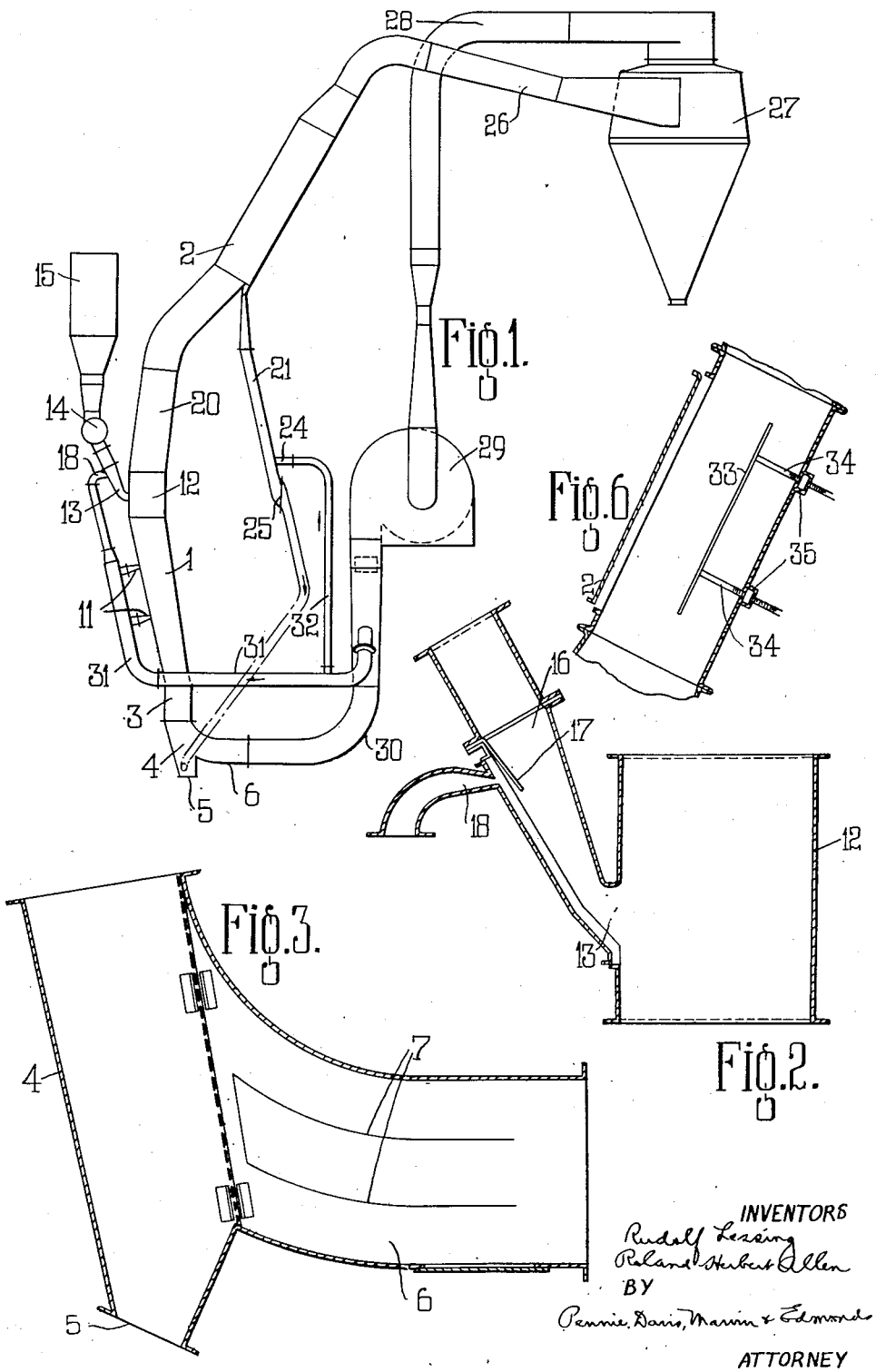

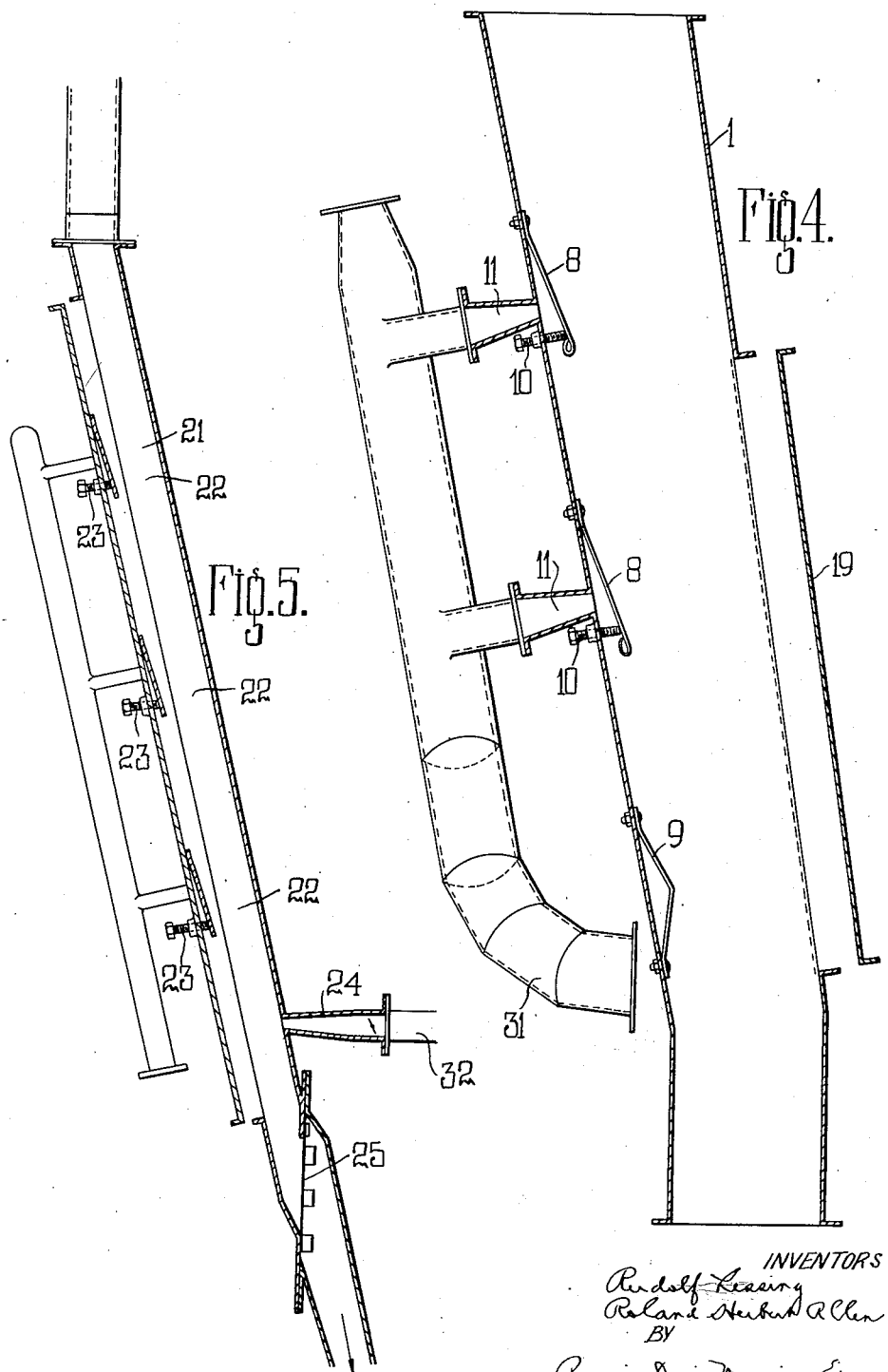

UNITED STATES PATENT OFFICE 2,000,181

SEPARATION OF POWDERED OR GRANULAR MATERIAL, ESPECIALLY COAL

Rudolf Lessing and Roland Herbert Allen, London, England, assignors to The Clean Coal Company Limited, London, England, a British company Application November 30, 1931, Serial No. 577,972
In Great Britain December 4, 1930

2 Claims. (Cl. 209—139)

This invention relates to improvements in and relating to the separation of powdered or granular material, whether natural, as in the case of coal or other material, or artificial as in the case of certain pigments or other inorganic substances. The object of the invention is to enable a mixture of coarse and fine particles to be separated into two or more grades within the desired limits of size.

The invention is particularly applicable to the treatment of coal. Thus it is very suitable for the treatment of coal slack or duff so as to separate all or substantially all the coal free or substantially free from dust.

According to the present invention there is provided an apparatus for separating powdered or granular material especially coal having a separator in the form of a tubular member with a port at its lower end for the removal of coarse material, a port near its lower end for the supply of gas and a port at a higher level for the supply of material to be treated, and in which the separator is arranged at a slight angle to the vertical and is provided with a flat or substantially flat lower side below the inlet for materials to be separated.

The apparatus is designed for use in the process for the separation of powdered or granular material into two or more grades of size in which the material is allowed to fall against an upflowing current of gas whereby the finer particles are carried upwards and preferably passed through an analyzer in which the medium fine particles are allowed to fall from the gas while the dust is carried on with the gas and afterwards separated therefrom.

The objects of the present invention are mainly to obtain a high throughput of material and to keep as low as possible the power required for operation, and also to facilitate the treatment of larger sized pieces without excessive breakage or damage to the air separator.

These advantages are secured according to the present invention by arranging the separator portion at a definite slight inclination from the vertical, for example 9°–15°, and forming the lower side flat or substantially flat. Thus the separator may be in the form of a slightly inclined rectangular member. The coal or other material to be treated is then allowed to slide down the lower wall of the separator and thus the larger pieces offer but little resistance to the upflowing gas current while the dust removed therefrom is carried up the upper side of the separator out of contact with the downfalling material. Deflectors are preferably provided on the flat lower side to cause the material to be continually thrown out into the gas stream in falling. These deflectors may be adjustable and the separator tube may be made openable, e. g. by having a detachable plate or plates in one wall to facilitate such adjustment. Inlets may be provided on the lower wall, preferably below or behind the deflectors, for admitting supplementary currents of gas into the separator. These assist in throwing the material into effective contact with the main gas stream and also enable the velocities at different portions of the separator tube to be varied in relation to each other. This is of advantage in obtaining the desired conditions for treating different coals according to their special characteristics.

By employing supplementary gas inlets on the lower wall of the separator, a convenient control of the yield and quality of the medium fines and dust products is made possible, since the main current at the bottom of the separator tube, and supplementary currents of gas admitted higher up may be independently adjusted to secure the desired velocity at any point in the separator.

The provision of these supplementary gas inlets makes it possible to effect such adjustment at any desired moment without any constructional alterations of the apparatus.

It may be desirable to provide a short vertical portion at the discharge end of the separator to ensure free access of the air or gas to the particles so as to remove the last traces of dust.

The main inlet for air or gas may be arranged at the side of the lower end of the separator, curved or angularly disposed reflector plates being placed in the inlet pipe to direct the entering gas upwardly into the separator.

Preferably the separator tube is surmounted by an upwardly directed analyzer tube which is also inclined slightly from the vertical and provided with one or more take off tubes whereby medium fine material carried out of the separator may be removed from the still upflowing gas current.

The analyzer may be provided with a longitudinally arranged plate member, preferably adjustable, which forms in effect a false lower side and assists in enabling the uprising larger particles to be separated from the gas current.

Preferably also the analyzer is provided with an inclined take-off chute for the medium fines which is flat or substantially flat on its under side and is provided with an inlet for a current of air or gas to flow thereup in order to remove any remaining dust from the product. This chute may suitably be of rectangular cross-section and deflecting plates or riffles may be suitably provided on the lower side to throw the material out into the gas stream. These deflecting plates may be adjustable if desired and one or more detachable plates may be provided to give access to the inside of the chute for periodical adjustment of the deflectors.

With the object of facilitating the removal of the dust from the material to be treated an inlet for air or gas may be provided at the lower part of the inlet for materials to be separated so as to blow the dust to the surface of the layer of material and facilitate its removal in the separator.

The velocity of the gas current in different parts of the separator or of the analyzer or both may also be varied by the provision of removable or adjustable plates on the walls of the separator and analyzer, in the case of the latter on the section above the medium fines outlet. The cross-sectional area of the separator or analyzer or both may thus be varied by adjustment of these plates as desired or necessary.

Figure 8:
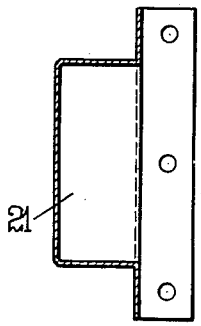
Figure 9:
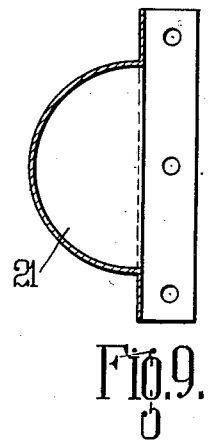

A preferred form of the invention is illustrated in the accompanying drawings in which Figure 1 is an elevation showing the general arrangement of a plant suitable for treating coal, Figure 2 is a sectional elevation of the coal feed, Figure 3 is a sectional elevation of the lower end of the separator showing the gas inlet, Figure 4 is a sectional elevation of the main part of the separator, Figure 5 is a sectional elevation of the take-off tube from the analyzer, Figure 6 is a sectional elevation of a modified form of analyzer tube, Figure 7 is a cross section on the line A—A of Figure 1, Figure 8 is a cross section on the line B—B of Figure 1, and Figure 9 is an alternative form of Figure 8.

Figures 2-9 are for convenience drawn to a larger scale than Figure 1.

In the drawings 1 is a separator tube and 2 is the analyzer tube. The separator tube 1 as shown is slightly inclined to the vertical, preferably about 9 to 15° and is provided at its lower end with a short vertical portion 3. The portion 4 below 3 is again somewhat inclined towards the outlet 5. The air or other gas enters the portion 4 from a pipe 6 entering at the side and the pipe 6 is provided with deflecting plates 7 which guide the gas current upwardly into the portion 4.

The separator 1 is preferably of rectangular cross-section as shown in Fig. 7. It may, however, have the cross-sectional shape illustrated in Figs. 8 or 9. In any case the lower side is flat and is provided with deflector plates 8 and 9. The deflector plates 8 are bolted or riveted to the flat wall of the separator 1 and are sprung outwardly by set screws 10 so that their position can be adjusted. Supplementary gas inlets 11 are provided behind the deflector plates 8.

The upper end of the separator tube 1 terminates in a short vertical portion 12 provided on the side adjacent the flat side of the separator tube with a coal inlet 13 communicating through a valve 14 with a coal hopper 15. From the valve 14 to the inlet 13 the coal passes through a duct 16, see Figure 2. This duct is provided on its lower side with a deflector 17 behind which is arranged a supplementary gas inlet 18.

The separator tube 1 is provided on its upper side with a detachable plate 19 which may be removed for inspection or repairs.

Above the vertical portion 12 the separator is connected to the lower portion of the analyzer tube 2 which is slightly inclined, as shown at 20, in a direction opposite to that of the separator tube 1. The upper part of the analyzer 2 is more sharply inclined and is of enlarged cross-section. To the lower side of the analyzer tube 2 there is attached an inclined take-off pipe 21 for medium fine constituents. The take-off tube 21 is preferably rectangular in cross-section as shown in Fig. 8. It may, however, have the cross-sectional shape illustrated in Figs. 7 or 9. In any case its lower side is flat. On the lower side of the take-off tube 21 are arranged deflector plates 22 similar to the deflector plates 8 in the separator tube and corresponding set screws 23. The lower end of the take-off tube is provided with a supplementary gas inlet 24 and below the gas inlet 24 with a weighted flap valve 25. Supplementary gas inlets 33 are arranged behind the deflector plates 8 as shown.

The upper end of the analyzer tube 2 is connected by the pipe 26 to a dust separator 27 preferably of the cyclone type. An outlet pipe 28 connects the dust separator 27 with a fan 29 by which the gas is returned to the apparatus through a pipe 30 and through branch pipes 31 and 32. The pipe 30 supplies gas to the main inlet 6, the pipe 31 supplies gas to the supplementary inlets 11 and 13 and the pipe 32 supplies gas to the supplementary inlet 24.

In operation coal is fed from the hopper 15, through the control valve 14 which may be of the rotary type, to the inlet 13. The deflector plate 17 and gas inlet 18 assist in projecting the coal from the outlet 13 across the portion 12 of the separator. Here the coal is met by an upflowing stream of gas from the inlet 6 and the supplementary inlets 11 and the finer material is carried upwards to the analyzer 2. The coarser material slides down the lower flat side of the separator tube 1 against the upflowing stream of gas and is thrown out into the gas current by the deflector plates 8 and the supplementary gas currents supplied at 11. Finer material is thus thoroughly scrubbed out with coal and the coarse material, substantially denuded of such fine material, emerges at 5.

The finer constituents and dust are carried upwards into the analyzer tube at the lower part 20 of which any coarse material which may have been carried up by the gas is thoroughly scrubbed and allowed to fall. As the finer material passes through the upper inclined portion of the analyzer 2 the medium fine constituents fall on to the lower side and escape through the take-off tube 21 where they are drawn off into repeated contact with the upflowing supplementary gas stream from 24 by the deflector plates 22. The medium fine constituents, after thus being scrubbed, escape through the flap valve 25.

The dust which has been removed from the coarser material and from the medium fine constituents is carried through the pipe 26 into the dust separator 27 where the dust is removed and the gas is finally delivered by the pipe 28 to the fan or blower 29 by which it is returned to the apparatus.

The analyzer tube may be constructed as shown in Figure 6. A longitudinal plate member 33 is mounted on rods 34 projecting through the lower wall of the analyzer tube 2. The rods 34 may be adjustably secured to the wall at 35 by any suitable means. The provision of this adjustable plate member enables the analyzer tube 2 to be made shorter than would otherwise be the case.

Additional valves or dampers, not shown, may be provided to control the delivery of the separated materials and the feed of gas at suitable points. Such valves or dampers as well as the flap valve 25 and rotary valve 14 may be mounted on ball bearings if desired.

The take-off chute for the medium fines may be connected as shown in Figure 1, to the outlet for coarse material where it is desirable to mix these products.

The improved apparatus described herein may be operated with hot or cold air or gas as desired. It may in some cases be desirable to supply cold gas at the bottom of the separator and hot gas at a higher level so as to ensure drying of the coal during separation and cooling of the material delivered from the lower end of the separator tube.

We declare that what we claim is:—

1. In apparatus for the separation of powdered or granular material especially coal by means of an upflowing gas current, a separator in the form of a tubular member slightly inclined to the vertical having an outlet port at its lower end for removal of coarse material, a gas port near its lower end for supply of gas to produce an upflowing gas current in said separator and an inlet port at a higher level for supply of material to be separated and said separator also having a substantially flat lower side below said inlet port, deflectors projecting from said flat lower side to guide solid materials away from said flat lower side and supplementary gas inlet means associated with said deflectors.

2. In apparatus for the separation of powdered or granular material especially coal comprising a tubular separator surmounted by an inclined tubular analyzer, take-off means on the lower side of said analyzer for withdrawal of medium fine material settling therein, an outlet port at the lower end of said separator for removal of coarse material, a gas port near the lower end of said separator for supply of gas to produce an upflowing current through said separator and analyzer and an inlet port at a higher level than said gas port for the supply of material to be separated, the provision of a separator having a flat lower side below said inlet port, an unobstructed upper side, deflectors projecting from said flat lower side to guide solid materials away from said flat lower side, and supplementary gas inlets associated with said deflectors.

RUDOLF LESSING.
ROLAND HERBERT ALLEN.